United States Patent [19]

Leathers

[11] Patent Number: 4,527,430
[45] Date of Patent: Jul. 9, 1985

[54] TRANSDUCER APPARATUS FOR MEASURING PRESSURE OF FLUIDS

[75] Inventor: Joel M. Leathers, Jones Creek, Tex.
[73] Assignee: The Dow Chemical Company, Midland, Mich.
[21] Appl. No.: 548,268
[22] Filed: Nov. 3, 1983
[51] Int. Cl.³ .......................... G01L 7/16; G01L 9/10
[52] U.S. Cl. .................................................... 73/745
[58] Field of Search ................. 73/745, 746, 744, 151

[56] References Cited

U.S. PATENT DOCUMENTS

| | | | |
|---|---|---|---|
| 2,044,005 | 6/1936 | Klein et al. | 73/744 |
| 3,442,134 | 5/1969 | Bennett et al. | 73/745 |
| 3,670,576 | 6/1972 | Corry | 73/744 |

Primary Examiner—Donald O. Woodiel
Attorney, Agent, or Firm—V. Dean Clausen

[57] ABSTRACT

The transducer device disclosed herein is designed for measuring the pressure of a moving fluid stream. The device includes a body member with a lengthwise bore therein and a pressure orifice in communication with the bore. Positioned in the bore is a one-piece piston consisting of a rod segment, a first stem segment extending from one end of the rod, a base segment at the opposite end of the rod, and another stem segment which extends from the base. The base is slideable in the bore of the body and there is an annulus section between the rod segment and the bore. A linear spring means is fitted over the rod, such that it occupies the annulus section. Ahead of the first stem is a sensor unit, which connects into a pressure indicator, for visually indicating pressure values. In operation, the body is mounted on a structure, such as a transfer line, which carries a fluid under pressure. The pressure orifice is in direct communication with the pressurized fluid, so that any change in the fluid pressure causes the sensor unit to produce an electrical signal. This signal is picked up by the indicator and displayed as units of pressure.

6 Claims, 3 Drawing Figures

TRANSDUCER APPARATUS FOR MEASURING PRESSURE OF FLUIDS

BACKGROUND OF THE INVENTION

The invention relates to an apparatus for measuring the pressure of fluids, particularly liquids. More specifically, the invention is directed to a transducer apparatus for measuring the pressure of a moving fluid stream.

There are many industrial operations which require continuous monitoring of the pressure generated by a moving fluid stream. One example is an operation referred to in the petroleum industry as hydraulic fracturing. In a typical fracturing operation, viscous liquids or slurry compositions are pumped into the well bore, by positive displacement pumps, at high pressures and high velocities. From the well bore, the pressurized liquid pushes into the rock formation containing the oil or gas to be recovered and "fractures" the rock outwardly from the well bore. The resulting cracks in the formation enhance the flow of the oil or gas into the well bore.

One way to measure the pressure of the fracturing fluid being pumped into the well bore is to install a pressure measuring device in the pipeline which carries the fluid from the pump to the well head. This places the pressure measuring device down stream from the high pressure side of the pump, so that it can measure the "average" line pressure. The type of devices usually employed for this purpose are conventional transducer instruments, which include resistance strain gauges or piezo beam strain gauges as the sensor components.

These instruments have several drawbacks which make them impractical for measuring the pressure of a moving liquid in the harsh environment of a field operation, such as that described above. For example, such instruments are highly sensitive to slight movements and to extreme temperature conditions. Because of the sensitivity factor, the signal output of the transducer must be electrically conditioned to get a gauge reading which is representative of the actual pressure of the fluid being monitored. Since these instruments are sensitive to movement, they are extremely vulnerable to vibration and shock, and they usually fail completely in situations where the fluid makes two or three consecutive pressure surges through the line which carries the fluid from the pump to the well head, or some other use point.

The transducer apparatus of this invention has a distinct advantage over the prior devices. For example, it is not sensitive to slight movements, it is not affected by wide variations in temperatures, and it is capable of responding rapidly and accurately to pressure surges ranging from zero pressure to very high pressures, without damaging the instrument or otherwise affecting its integrity.

SUMMARY OF THE INVENTION

The transducer apparatus of this invention is designed for measuring pressure of a moving fluid stream, such as liquids, gases, mixtures of liquids and gases, and in some instances, liquid phase or gaseous phase materials which contain solid materials. Basic components of the apparatus include a body member and a piston which fits inside the body member. Specifically, the body has a lengthwise cylindrical bore therein and a pressure orifice in communication with the bore. The piston itself is an integral cylindrical structure which is made up of a rod segment, a first stem segment extending from one end of the rod segment, a base segment at the opposite end of the rod segment, and a second stem segment extending from the base segment.

The rod segment is of smaller diameter than the bore in the body member, so that an annulus section is defined between the rod segment and the bore. The diameter of the base segment is larger than that of the rod segment and the base segment is slidable in the body bore. A guide plug, with a guide passage therein, is fastened into the body bore ahead of the piston. The first stem segment is slidable in the guide plug passage, and the second stem segment is slidable in the pressure orifice. A spring means fits over the rod segment of the piston, such that it is positioned within the annulus section. The transducer apparatus also includes a sensor unit and a pressure indicator. The sensor unit consists of a magnetometer positioned ahead of the first stem segment of the piston and a rectifier circuit in proximity to the magnetometer. In turn, the pressure indicator connects into the rectifier circuit.

The body member is adapted for mounting on a structure, such as a pipeline, which is designed to carry a fluid under pressure. It is mounted such that the pressure orifice is in direct communication with the pressurized fluid. In a typical operation of this apparatus, a change in the fluid pressure causes the first stem segment of the piston to move toward or away from the magnetometer. In response to this movement, the magnetometer produces an output voltage which is converted by the rectifier circuit into an electrical signal. The signal is, in turn, picked up by the pressure indicator and displayed as units of pressure.

DESCRIPTION OF THE DRAWINGS

The same reference numerals are used in each drawing to describe parts of the transducer apparatus which are identical.

DESCRIPTION OF THE INVENTION

Figure 1:
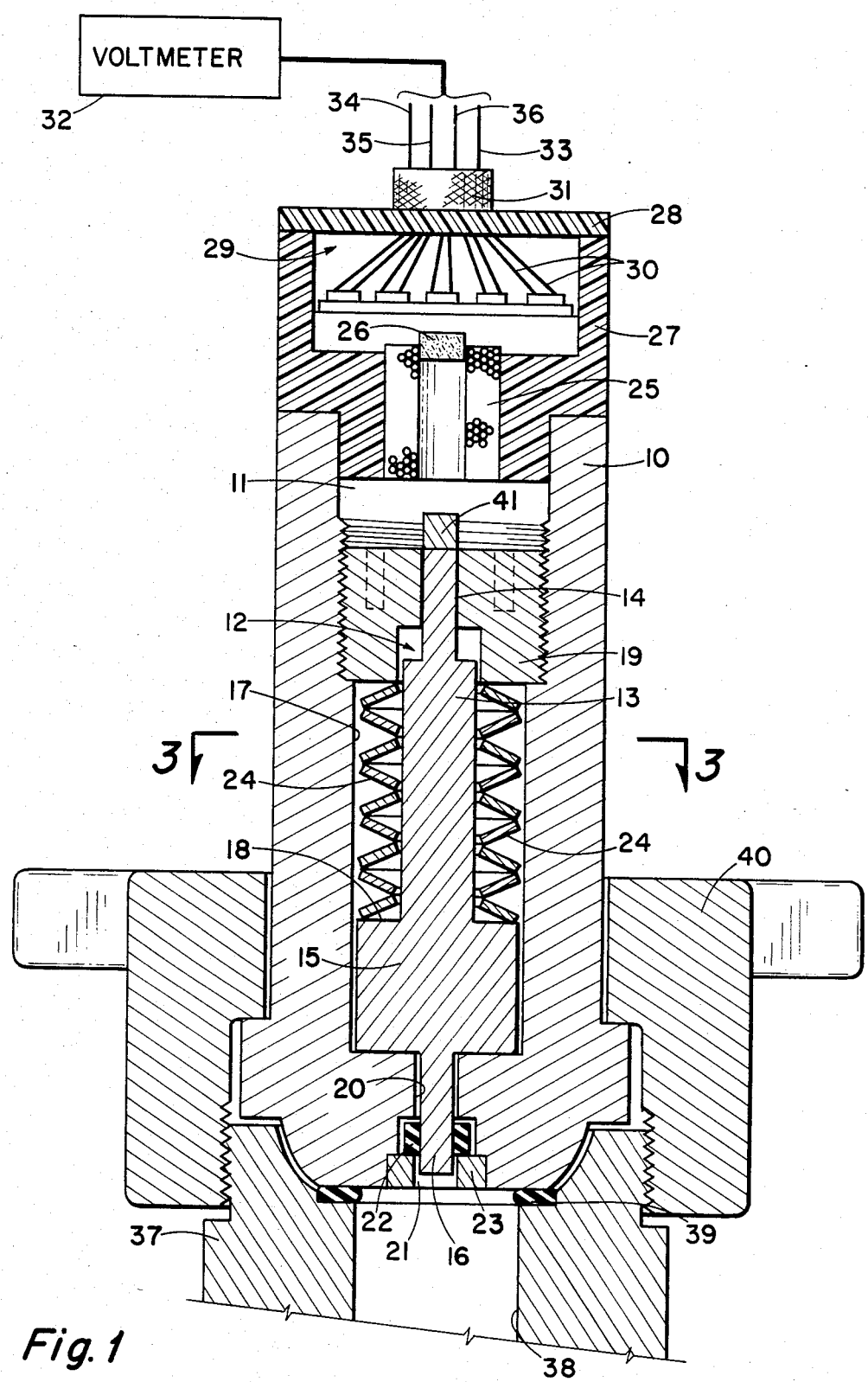
FIG. 1 is a front elevation view, mostly in section, of one embodiment of the transducer apparatus of this invention.

Referring to the drawings, particularly FIG. 1, the transducer device includes a body 10 which has a lengthwise cylindrical bore 11 therein. The major component of the transducer device is a piston, generally indicated by the numeral 12. In the present embodiment, the piston is an integral cylindrical structure consisting of a rod segment 13 and a stem segment 14, which extends outwardly from one end of the rod segment. At the opposite end of the rod segment is a base segment 15 and a second stem segment 16, which extends from the opposite side of the base segment. The diameter of the rod segment 13 is smaller than the bore 11, such that an annulus section 17 is defined between the rod segment and the wall surface of the bore.

The diameter of the base segment 15, as shown in the drawing, is larger than the diameter of the rod segment 13, but it is smaller than the bore 11. This structure allows the base segment to slide within the bore 11. A shoulder 18 is formed at the point where the base segment 15 and the rod segment 13 are joined. At the top of body 10 is a guide plug 19, which is threaded into bore 11 of the body. Plug 19 has a central opening therein which provides a guide passage for stem 14 to slide in. At the bottom of body 10 is a pressure orifice 20. The pressure orifice communicates with bore 11 and it provides a passageway in which the second stem 16 can slide back and forth. As shown in FIG. 1, the face (or end) of stem 16 is located above the entrance to the pressure orifice 20. When the piston 12 is at its "rest" position, the position of stem 16 thus defines a recess section 21 in the pressure orifice below the face of the stem.

A fluid-tight seal 22 is fitted onto stem 16 to prevent fluid from by-passing the stem and forcing its way into the annulus section 17. The seal is held in place by a packing gland 23, which is fastened into the body 10 by set screws (not shown), or other suitable fasteners. A stack of several disc springs, each being indicated by the numeral 24, are positioned over the rod segment 13 of the piston 12. The function of these springs is to provide a resistance to the force (pressure) of the fluid acting against the face of stem 16. The springs 24 thus determine the precise distance that piston 12 will travel in response to a given amount of force (pressure).

A sensor unit is positioned in the transducer apparatus above the piston 12. One part of the sensor unit consists of a magnetometer unit, which is made up of a wire sensing coil 25 and a DC biasing magnet 26. Magnet 26 is preferably fabricated of sintered ceramic material and it is mounted just inside the top end of the coil 25, using glue to hold it in place. In turn, the coil 25 is fastened into a sensor housing 27, which is sealed at the top by a cover 28. The sensor unit also includes a rectifier circuit generally indicated by numeral 29, which is mounted in the sensor housing immediately above the magnetometer.

Output from the rectifier circuit 29 is directed to electrical leads 30 and into a cable connector 31. From connector 31, the signal is carried to a voltmeter 32 through a signal lead 33, which connects the voltmeter into the rectifier circuit. The voltmeter 32 is also linked to the rectifier circuit 29 by an input connection 34, output connection 35, and a common lead 36.

OPERATION

The present invention can be illustrated by describing a typical operation in which the transducer device is used to measure the pressure of a fluid, such as a fracturing fluid, which is being pumped through a transfer line from a positive displacement pump into a well bore. The fluid itself, the pump, the well bore, and the transfer line which carries the fluid to the well bore, are not shown in the drawings. Referring particularly to FIG. 1, numeral 37 indicates the male part of a union fitting which is installed in the transfer line. As shown, the transducer body 10 is seated down into the male part 37, such that the recess section 21 of pressure orifice 20 is in vertical alignment with the bore 38 of the union fitting. A rubber seal 39 is placed between the bottom face of the body 10 and the lip of the male part 37, to provide a fluid-tight connection, and the body is drawn down into the male part by wing nut 40.

As the fracturing fluid moves through the transfer line, it fills up the bore 38 and recess section 21, so that it exerts a force (pressure) against the face of stem 16. Once the resulting force exceeds a preset figure, for example, zero pressure, the piston 12 will move toward the sensing coil 25. Conversely, if the pressure is below the preset figure, the piston will remain stationary. Assume, for example, that the pressure of the moving fluid at a given time is above the preset figure of zero pressure. In response to the positive pressure, piston 12 will move a given distance toward the sensing coil 25. A cap 41, which is made of a highly magnetic permeable material, such as Mu metal, is bonded to the tip of stem 14. As piston 12 moves toward the coil 25, the combined function of the magnetic cap 41 and the DC biasing magnet 26 induces a changing electrical field, that is, it causes an imbalance in the DC and AC magnetic fields which are present in the magnetometer unit. This imbalance is sensed by the magnetometer unit, which has been excited with an AC voltage, so that the output voltage is also sensed by the secondary winding as an AC voltage.

The AC output voltage comes out of the magnetometer unit at two times the excitation frequency, and is passed through the rectifier circuit 29, which converts it back to DC voltage. The DC voltage is then fed into the voltmeter 32 through signal lead 33. The signal received by the voltmeter, after calibration, is directly proportional to the pressure (force) exerted by the fracturing fluid as it moves through the transfer line to the well head. In actual practice, the pressure readings picked up by the voltmeter, as analog data, are fed into a recording device, such as a strip chart recorder, or a computer, after first converting the analog data to digital data, so that the computer can receive it. The strip chart and computer recording devices are not illustrated in the drawings.

The spring disc 24 used in the practice of this invention are conventional disc-type springs. These springs, which are also referred to as Belleville washers, are manufactured by Key Bellevilles, Inc., Leechburg, Pa. The spring discs are available in sizes ranging from $\frac{1}{2}$ inch outside diameter to 30 inches outside diameter, and up to $1\frac{1}{2}$ inches thick. The actual size of the spring disc to be used is determined by the maximum amount of pressure (force) which is it assumed that the fluid will exert against the face of the piston stem 16. When the maximum pressure figure has been determined, the next step is to calculate the size (diameter) of the pressure orifice 20 and the piston stem 16. These calculations are made using the following equation:

$$\text{DIA.} \approx [\{\nu([1/(P_1/P_2]/\pi)\}2]25.4$$

where

DIA. = diameter of the face of the piston stem, mm.
$P_1$ = maximum rated pressure of the system being monitored, p.s.i.
$P_2$ = load rating of the spring disc, lbs.

The next calculation involves determining a given distance for the piston to travel in response to the maximum pressure. Once this distance is established, the size and spring rate of each disc, the number of discs to be used, and the arrangement in which the discs are stacked, can be calculated. For example, in the practice of one embodiment of this invention, it was determined that the transducer apparatus should be capable of measuring a pressure value in the range of 0 to 30,000 psi. For this range, it was calculated that the dimensions for each spring disc 24 should 1.340 inches outside diameter, 0.642 inches inside diameter, and 0.0787 inches thickness.

The spring rate for each disc is the property of the disc which defines the amount of linear deflection (or movement) the disc will undergo in response to a given load. The spring rate is usually calculated as deflection (movement) in inches versus pounds per square inch load. As a general rule, the spring rate is set at 75 percent of the maximum value, so that the spring will have an infinite operating life. Specific information regarding calculation of the spring rate of Belleville spring discs, and information on other characteristics of these springs, is contained in a publication entitled "Engineering Design Handbook", which is distributed by Key Bellevilles, Inc.

In the example described herein, it was calculated that the spring rate for each disc, at 75 percent of maximum value, should be 1407 pounds. Under this amount of force, the disc will deflect (move) a maximum distance of 0.022 inches. As shown in FIG. 1, the spring discs 24 are stacked around the rod segment 13 of piston 12 in an orientation known as a parallel arrangement. When stacked in a parallel arrangement, each spring disc in the stack will deflect a distance of 0.022 inches, so that the total travelled distance for piston 12 is determined by the actual number of discs in the stack. For example, if there are 15 discs in the stack, the piston will travel a total distance of 0.330 inches in response to the maximum fluid pressure of 30,000 p.s.i. However, in the parallel orientation, the entire stack will resist the load being applied against the face of piston stem 16 with a force of only 1407 pounds (the spring rate for a single disc).

Figure 2:
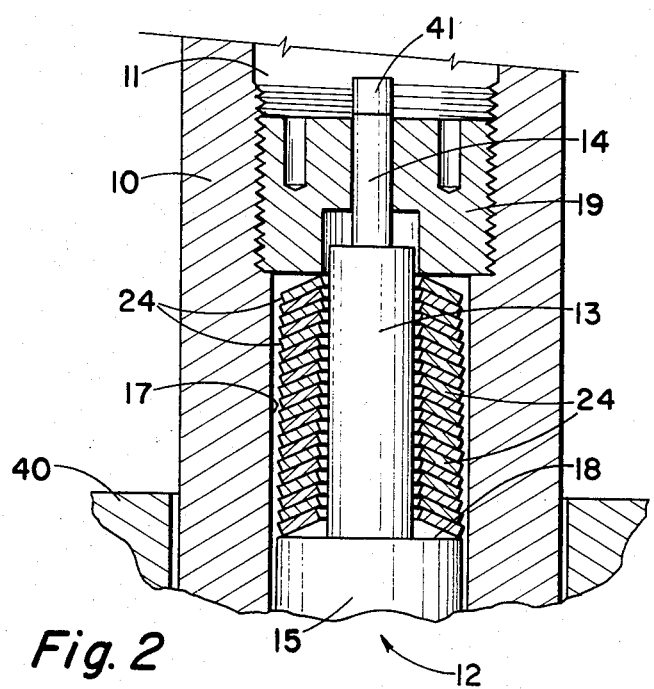
FIG. 2 is a fragmentary view of the transducer apparatus, which illustrates a different arrangement for the disc spring components of the transducer than the arrangement shown in FIG. 1.
Figure 3:
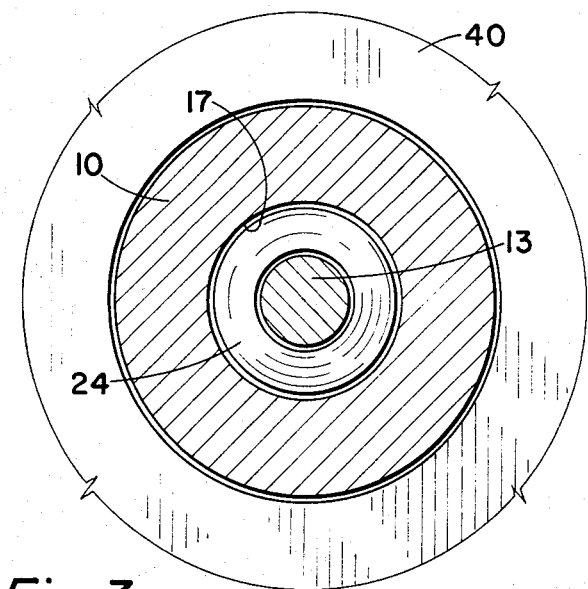
FIG. 3 is a cross-section view of the transducer apparatus, taken on line 3—3 of FIG. 1.

Another arrangement for stacking the spring discs 24 around the rod segment 13 is illustrated in FIG. 2. This arrangement of the stacked discs is known as a series orientation. When the discs are stacked in series, each disc in the stack will resist the load being applied against the face of piston stem 16 with a force of 1407 pounds, but the entire travelled distance of piston 12 will not exceed the rated deflection for one disc, that is, 0.022 inches. Therefore, at the maximum fluid pressure of 30,000 p.s.i., the piston 12 will travel only a total distance of 0.022 inches.

There are several other arrangements for stacking the spring discs 24 which may be used in the practice of this invention. These arrangements are specifically described in the engineering handbook referred to above. As described in the handbook, the variations in the stacking arrangement are usually combinations of parallel and series orientation, or the use of spring discs of different thicknesses in the same stack. The actual arrangement of the discs in a given stack will depend on several factors, such as the range of pressure which it is desired to measure and the sensitivity of the measurement, that is, the smallest pressure value it is desired to measure. In practice, the transducer apparatus of this invention is capable of sensing pressures in the range of zero pressure up to 100,000 psi.

In the example described herein, the transducer apparatus is used to measure the pressure of a fracturing slurry, which is a stream consisting primarily of a liquid phase. The present apparatus can also be used to measure the pressure of fluid streams which contain only a gaseous phase, or a mixture of gases and liquids, or a mixture of solid materials with either a gas phase or liquid phase.

The invention claimed is:

1. A transducer apparatus for measuring the pressure of a moving fluid stream, the apparatus comprising:
    a body member having a lengthwise cylindrical bore therein and a pressure orifice in communication with said bore;
    a piston defined by an integral cylindrical structure which includes a rod segment, a first stem segment which extends from one end of the rod segment, a base segment at the opposite end of the rod segment, and a second stem segment which extends from the base segment;
    the rod segment has a smaller diameter than the body bore, to define an annulus section between the rod segment and the bore, the base segment has a larger diameter than the rod segment, and said base segment is slidable within the body bore;
    a guide plug having a guide passage therein is fastened into the body bore ahead of the piston, the first stem segment is slidable within the guide plug passage, and the second stem segment is slidable within the pressure orifice;
    a linear spring means is carried on the rod segment of the piston, and is positioned within the annulus section;
    a sensor unit which includes a magnetometer positioned ahead of the first stem segment of the piston, and a rectifier circuit in proximity to the magnetometer;
    a pressure indicator means which connects into the rectifier circuit, for visually indicating pressure values;
    the body member is adapted for mounting on a structure designed to carry a fluid under pressure, the mounting arrangement being such that the pressure orifice is in direct communication with the pressurized fluid; and wherein
    a change in the fluid pressure causes the first stem segment of the piston to move toward or away from the magnetometer, the magnetometer produces an output voltage which is converted by the rectifier circuit into an electrical signal, and the signal is picked up by the indicator means and displayed as units of pressure.

2. The transducer apparatus of claim 1 in which the spring means consists of a stack of linear disc springs which fit down over the rod segment of the piston and seat against a shoulder surface defined by the base segment of the piston.

3. The transducer apparatus of claim 2 in which the disc springs which fit over the rod segment are stacked in a parallel arrangement.

4. The transducer apparatus of claim 2 in which the disc springs which fit over the rod segment are stacked in a series arrangement.

5. The transducer apparatus of claim 1 in which the end of the second stem segment is positioned above the entrace to the pressure orifice, to define a recess section in said orifice.

6. The transducer apparatus of claim 5 in which a fluid-tight seal encloses the second stem segment above the recess section in the pressure orifice.

* * * * *